3,400,249
HEATING SYSTEM
Matthew Mekjean and James S. Sconce, Niagara Falls, N.Y., assignors to Hooker Chemical Corporation, Niagara Falls, N.Y., a corporation of New York
Continuation of application Ser. No. 368,590, May 19, 1964. This application Oct. 26, 1966, Ser. No. 589,764
8 Claims. (Cl. 219—378)

ABSTRACT OF THE DISCLOSURE

A heating system comprising means for conducting a heat transfer medium to a heat storage unit, a heat storage unit comprising a substantially anhydrous heat storage medium comprised of a major proportion of an alkali metal hydroxide and a minor proportion of a non-reducing agent and a corrosion inhibitor, said heat storage unit having heating means within said heat storage medium for heating said heat storage medium to a temperature above the fusion point of the heat storage medium, means for bringing said heat transfer medium into thermal contact with said heat storage unit, means for conducting said heat transfer medium from said heat transfer unit and means for withdrawing heat therefrom to cool said heat storage medium below its fusion point.

---

This is a continuation of S.N. 368,590, filed May 19, 1964 which is in turn a continuation-in-part of S.N. 329,246, filed Dec. 9, 1963, both now abandoned.

This invention relates to a novel heating system. More particularly, it relates to a heating system capable of storing heat at high temperatures for a substantial period of time and of giving up this heat, when desired.

The present invention provides a novel approach to the heating of heat transfer media and includes a heat storage unit that does not require a continuous supply of external heat, such as is obtained from electricity, gas, or oil. The invention can supply stored heat to a heat transfer medium rapidly and efficiently and needs a minimum amount of maintenance.

The various aspects and features of the invention will become apparent from the following description and the accompanying drawings in which.

Figure 1:
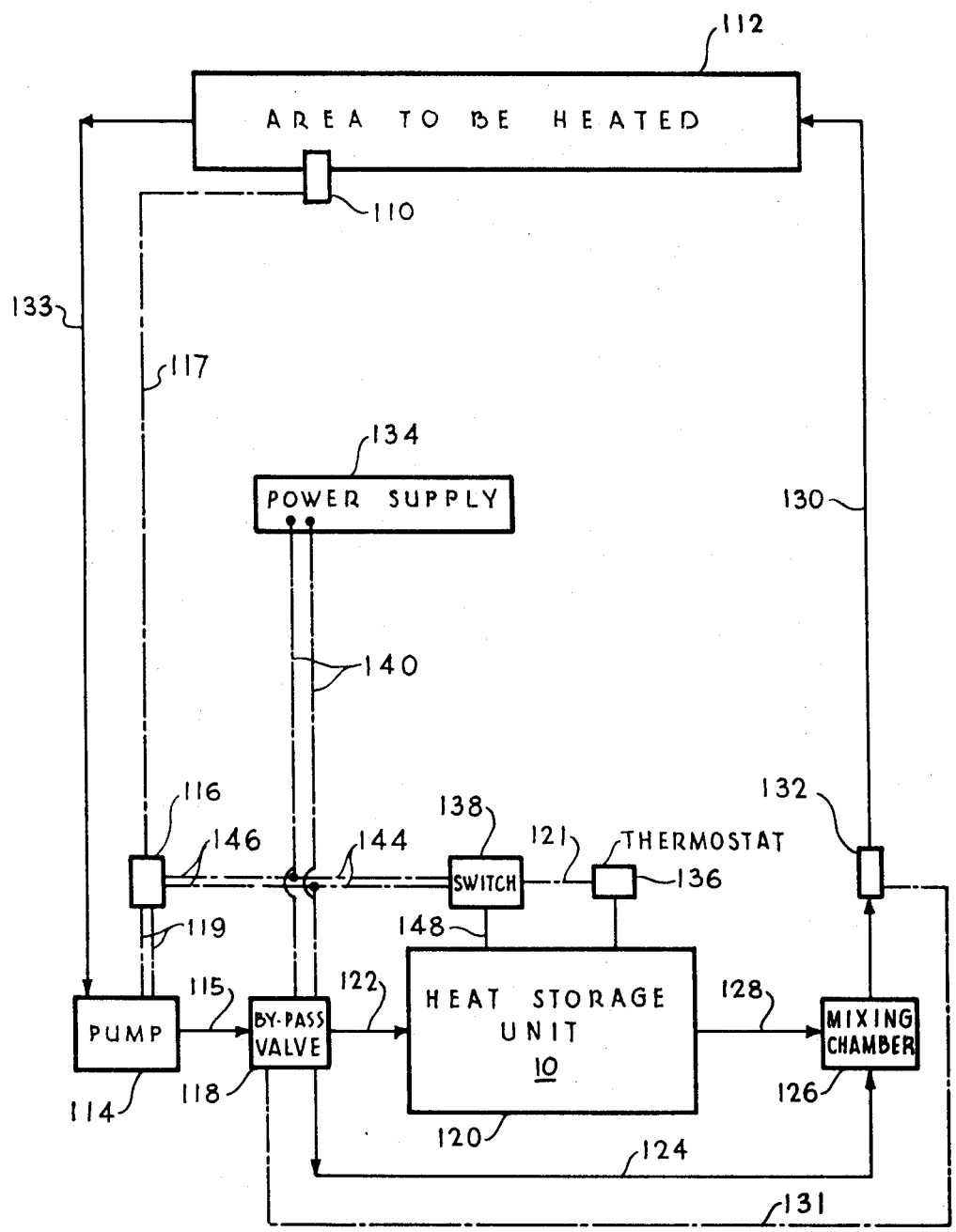
FIG. 1 is a diagrammatic representation of the novel heating system of the invention.

It has been discovered that a novel heating system comprising means for conveying a heat transfer medium to a heat storage unit, a heat storage medium comprising an alkali metal hydroxide, a non-reducing agent and a corrosion inhibitor within said heat storage unit to convey heat to the heat transfer medium, heating means within said heating unit to heat the heat storage medium and means for conveying said heat transfer medium from said heating unit, is an economical, quiet, substantially non-corrosive, clean and rapid means for supplying heat.

Referring to the drawings, heating unit 10, having insulation 16 between the exterior walls 12, and interior walls 15, cover 11, baffle means 13, unit dividers 17, inlet 30 and outlet 32, houses heat storage reservoir 18. These reservoirs 18 contain heat storage medium 20 and electrical heating elements 22. Power supply lines 24 and 26 are in operative relationship with the terminals 23 and 25, respectively, of the heating elements 22. The source of power 134 is illustrated in FIG. 1.

Manifold means 28 is in operative relationship with the heat storage reservoirs and a "fluid piston" vent sealing means 36.

The operation of the heating system is clearly shown by FIG. 1. When thermostat 110, located in an area 112 to be heated, calls for heat via signal line 117 and power line 119, pump 114, activated by switch 116 forces a heat transfer medium, such as air, through conduit 115 to and through a by-pass valve 118. Some of the heat transfer medium is conveyed through the casing 120 of the heat storage unit 10 via line 122 while another portion of the heat transfer medium is conveyed through by-pass conduit 124 to a mixing chamber 126. The heat transfer medium is conveyed over or through heat storage reservoirs within the heat storage unit 10 and is then directed through line 128 to mixing chamber 126. Non-heated medium and heated medium from by-pass conduit 124 and line 128, respectively, are mixed in mixing chamber 126. The mixed medium then passes through heat transfer conduit 130 to the area 112 that requires heat. Return line 133 conveys the heat transfer medium back to pump or blower 114. Positioned in or on the heat transfer conduit 130 is a temperature control thermostat 132 that is connected in operative relation with mixing valve 118 so that the temperature of the heat transfer medium is maintained within a predetermined range. With respect to the electrical power supply 134 power lines 140, 119, 144, 146 and 148 supply power to the by-pass valve 118, pump 114, switches 138 and 116, and heat storage unit 10, respectively. Lines 117, 121, and 131 supply signals from thermostat 110 to switch 116, from thermostat 136 to switch 138 and from thermostat 132 to by-pass valve 118, respectively.

Figure 3:
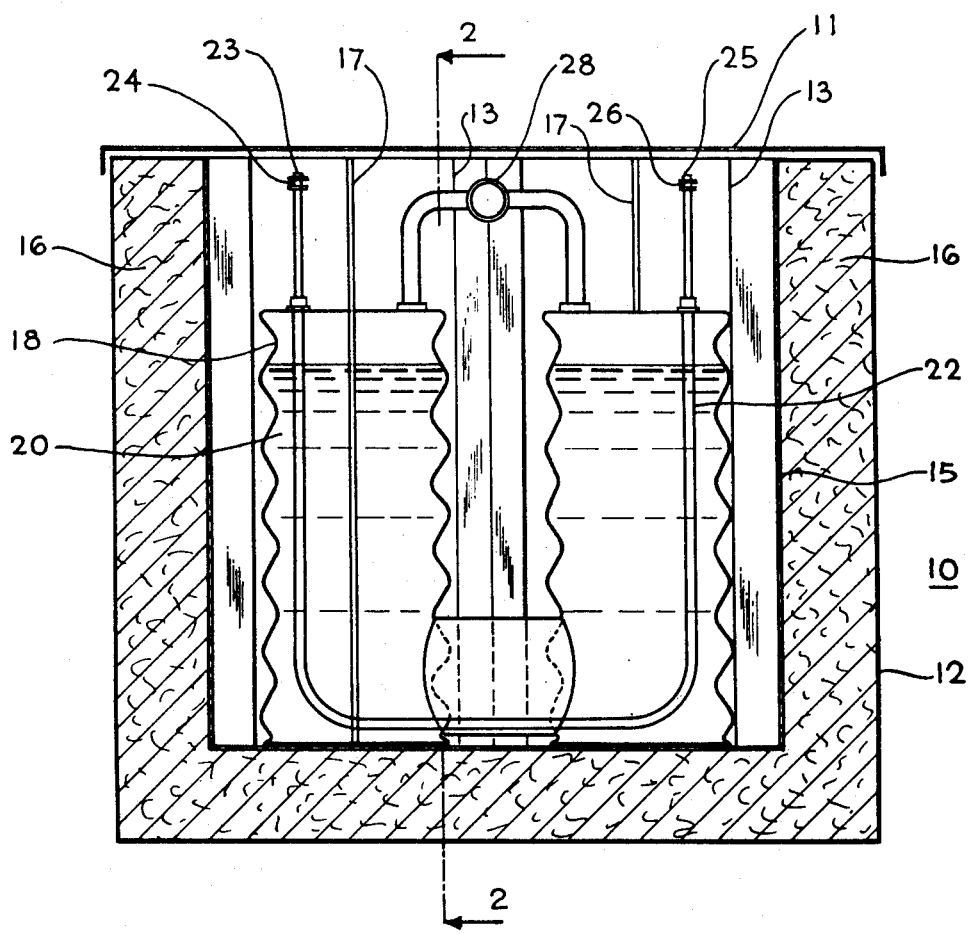
FIG. 3 is a vertical sectional view of a heating unit of the invention along line 3—3 of FIGURE 2.
Figure 4:
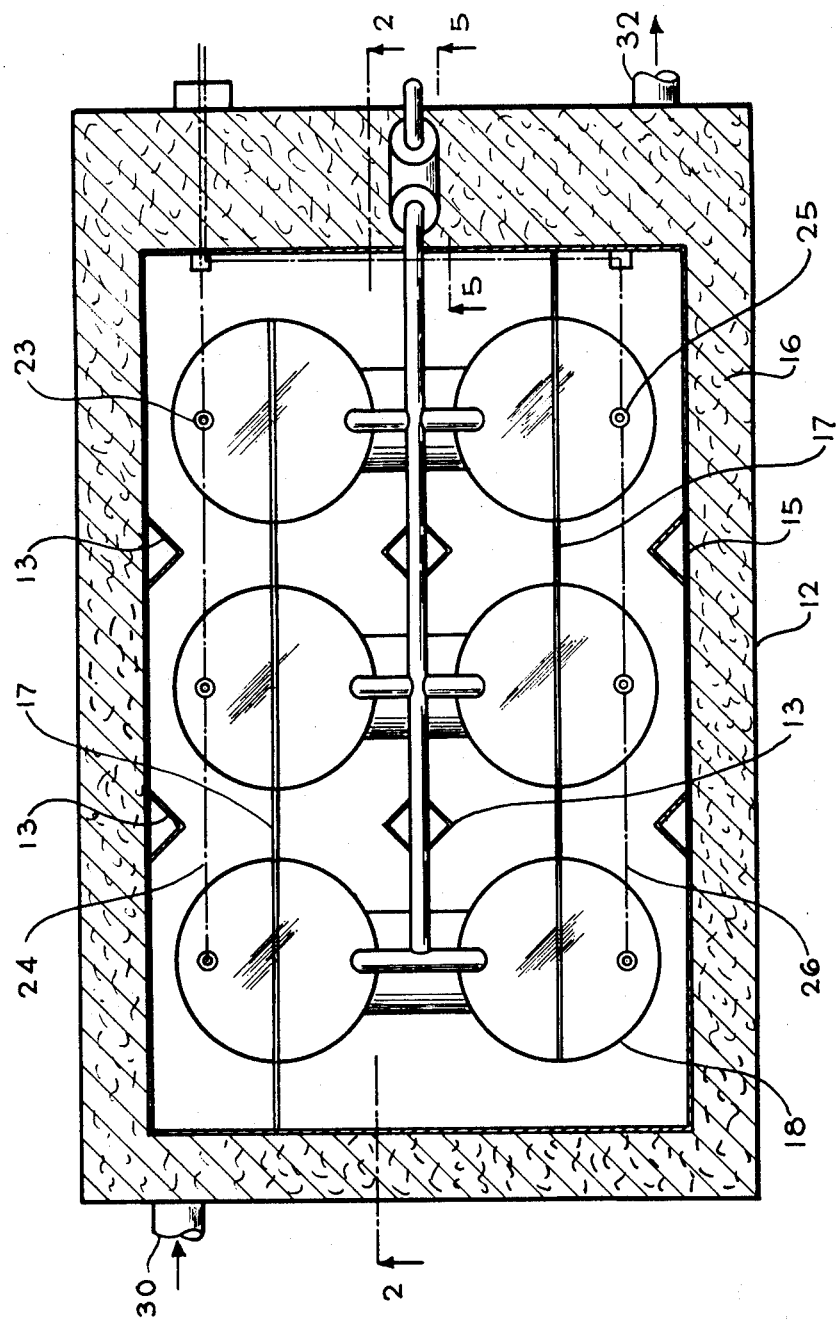
FIG. 4 is a plan view of a heating unit of the invention along line 4—4 of FIG. 2, showing baffle units.

The baffles 13 in the heating unit, as illustrated in FIGS. 3 and 4, are positioned in such a manner that there is an efficient flow of heat transfer medium through the heat storage unit 10. Although the heat storage medium, as illustrated, by the drawings, is heated with electricity, it is to be understood that gas, oil and other suitable heating means may be adapted to heat the medium 20 in the heat storage reservoir 18.

According to the invention a modified alkali metal hydroxide heat storage medium is added to the reservoir 18 and heated to a temperature of from about 60 to about 680 degrees centigrade. The heat in this medium is subsequently extracted by passing over the outside of the reservoir a heat transfer medium such as air, high temperature oil, liquid sodium and the like, air being the preferred medium. Of course, these media may be used to heat other heat-transfer media, such as air, water, diphenyl, diphenyl ether and so forth. The heat storage medium 20 is described in copending application S.N. 329,246 filed Dec. 9, 1963, now abandoned. It comprises a major proportion of an alkali metal hydroxide and a minor proportion of a non-reducing agent. The term "non-reducing salt" as utilized in this description means a salt that will yield an "oxidizing bath" or a "neutral bath," as this terminology is employed in the alloy steel industry. In this industry molten alkali metal hydroxide salt baths assist in the conversion of the heat scale, developed in annealing and hot rolling mill operations, to a soluble form for subsequent removal. These descaling baths are alkaline baths, e.g., modified molten caustic baths, and the type of additives incorporated in the caustic melt determines the classification of the bath. For example, if sodium nitrate, an oxidizing agent under these conditions, is added to the anhydrous caustic melt, an oxidizing bath is formed, whereas, if a neutral agent (one neither oxidizing nor reducing) is added, e.g., sodium sulfate, a neutral bath is formed. The term "non-reducing salt bath" therefore means an alkali metal hydroxide bath that contains either an additive that acts as an oxidizing agent or a neutral agent in an alkali metal hydroxide salt bath.

The term "heat storage medium," as utilized in this description, means a medium from which useful heat may be withdrawn at a rate of not less than 7,500 B.t.u. per hour per 100,000 B.t.u. of useful heat storage capacity.

Examples of alkali metal hydroxides that may be utilized in this invention are hydroxides of potassium, sodium, lithium, rubidium, cesium, and mixtures thereof. Sodium hydroxide and sodium-potassium hydroxide mixtures are preferred. The alkali metal hydroxide is usually present in the bath in a major proportion, from 51 to about 99 percent by weight of the mixture, with the preferred proportion of alkali metal hydroxide in the bath being from 70 to about 99 percent of the mixture. In some instances a minor amount of alkali metal hydroxide may be utilized, e.g., 20 percent by weight of a medium may be sodium hydroxide and about 80 percent sodium nitrate with corrosion inhibitors such as sodium dichromate also present.

As stated above, non-reducing agents include "neutral agents" and "oxidizing agents." These additives are usually present in the heat storage medium in proportion from 1 to 49 percent by weight of the mixture, with good results being achieved when the additive comprises from 1 to about 30 percent by weight of the heat storage medium. The most beneficial results, however, are obtained when from 5 to 10 percent by weight of the mixture is made up of the non-reducing agent or agents.

Examples of neutral agents that may be utilized in the invention are alkali metal and alkaline earth metal sulfates, phosphates, halides, carbonates, stannates, silicates, fluosilicates, fluoborates, tetraborates, metaborates, aluminates, bismuthates, borates, molybdates, tungstates, vanadates, and mixtures thereof, such as sodium carbonate, sodium sulfate, potassium sulfate, lithium carbonate, calcium iodate, magnesium chloride, magnesium orthophosphate, magnesium pyrophosphate, sodium metaphosphate, potassium metasilicate, sodium tetraborate, potassium bromate, lithium iodide, potassium meta aluminate, and the like.

Examples of oxidizing agents that may be utilized in the invention are alkali metal and alkaline earth metal nitrates, nitrites, manganates, permanganates, iodates, chlorates, perchlorates, persulfates, chromates, dichromates, hypochlorites, oxides, perborates, such as, sodium nitrate, sodium nitrite, magnesium nitrate, calcium nitrite, potassium manganate, potassium permanganate, sodium chlorates, sodium perchlorate, lithium chromate, potassium hypochlorite, sodium hypochlorite, sodium metaborate peroxyhydrate and oxides such as manganese dioxide, stannous oxide, stannic dioxide, titanium dioxide, molybdenum trioxide, chromium trioxide, vanadium pentoxide, phosphorus pentoxide, tungsten trioxide, and so forth, and mixtures thereof that will form non-reducing agents.

Although it is preferred to utilize sodium hydroxide as the major constituent of the heat storage medium, mixtures of the alkali metal hydroxides, e.g., sodium and potassium hydroxides, may also be employed. Generally, this mixture of a non-reducing hydroxy salt bath when exposed to the atmosphere does not cause a corrosion problem. However, when placed in an environment which excludes air, or includes only a small proportion thereof, not in communication with the atmosphere, these baths are not preferred. If, for example, a salt solution of sodium hydroxide and sodium nitrate is placed in an open container and heated to about 260 degrees centigrade, corrosion will not be a problem. When the same mixture is placed in a closed steel container, undesirable effects result, i.e., some corrosion of the container is caused. It has been found that corrosion becomes insignificant when the inhibitor additives set forth herein are added to an alkali hydroxide salt bath composition that is kept out of contact with the atmosphere, e.g., a system where the only air that enters and exits is that moved by the heating and cooling of the storage medium and where outside air is not brought in.

Examples of inhibitors that may be utilized, substantially to reduce the corrosion of the reservoir, are alkali metal chromates, dichromates, phosphates and pyrophosphates; ferrophosphorus; iron; iron compounds and mixtures thereof, such as, sodium chromate, potassium chromate, potassium dichromate, lithium dichromate, sodium phosphate, potassium pyrophosphate, iron oxide, iron particles, and so forth. These inhibitors reduce corrosion in low carbon steel reservoirs, such as, steel bearing an American Iron and Steel Institute Number 1020, and lower, classification. Nickel steel and nickel may also be utilized as reservoir containers for the medium disclosed herein with beneficial results. It has been found that by saturating the salt bath with iron particles, corrosion will also be inhibited. The amount of corrosion inhibitor additive that may be added to the salt composition may vary from about 0.1 percent to about 30 percent by weight of the heat storage composition depending on solubilities and melting points desired. It is one of the desirable characteristics of the medium to be employed that it have a low melting point and remain in a liquid state over a range of about 380 centigrade degrees to allow for a more efficient removal of heat from the medium. Good results with respect to corrosion have been obtained when the additive is present in from 0.1 to about 5 percent of the salt medium with best results being obtained when the salt medium contains from 0.1 to 2.0 percent of an inhibitor.

The aforementioned inhibitors are useful in both media free of air and in contact with air, but are preferred to be utilized in media that are free of air.

It is preferred to utilize a minor proportion of an oxidizing agent in the practice of the invention. However, this does not limit the invention to such agents, as a neutral agent with the alkali metal hydroxide is also satisfactorily employed. It has been further found that upon utilizing the salt bath compositions set forth herein, heating them between a temperature from about 60 to 520 degrees centigrade and removing the source of heat, the loss of heat from the composition is gradual and in a series of steps. It has been found that about one-third of the heat is released from between 520 degrees centigrade to its freezing point, about 290 degrees centigrade, depending on composition. Thereafter, about one-third of its heat is released at the freezing point as the heat of crystallization, with the balance of stored heat from the composition being released as it cools to about 81 degrees centigrade.

It has seen that the salt compositions of the present invention have been found to be surprisingly desirable as they have a long liquid range between the melting point and boiling point.

To more fully understand the invention, one may compare the composition disclosed herein with water. Water may be utilized as a heat storage medium, but it has inherent physical properties which limit its desirability. It can store heat only at low temperature levels (at atmospheric pressure), making the volume of water required to store heat unacceptable and impractical. For example, to store 350,000 B.t.u. at atmospheric pressure at a temperature of from about 40 degrees centigrade to about 100 degrees centigrade, a water system would require a tank with a minimum capacity of 58.3 cubic feet, or 437 gal- Ions, without allowing any space for air or vapor above the liquid. In contrast to water, a preferred anhydrous alkali metal hydroxide mixture of the invention, about 90 percent sodium hydroxide, 8.0 percent sodium nitrate, and about 1 percent sodium dichromate operating from 120 degrees centigrade to about 540 degrees centigrade, can store 350,000 B.t.u. in a volume of 6.3 cubic feet, or 47.2 gallons.

Figure 5:
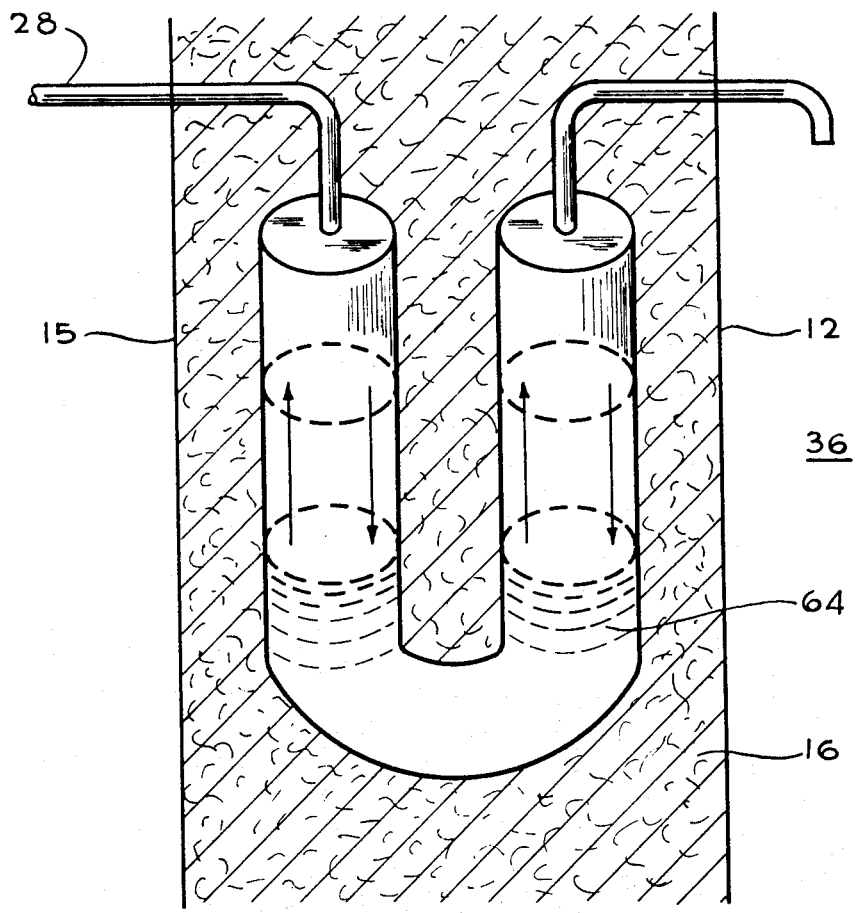
FIG. 5 is a section of a vent sealing means along line 5—5 of FIGURE 4.

FIG. 5 illustrates another feature of the invention. The heat storage medium 20, in the proposed mode of operation, is to be kept substantially out of communication with the atmosphere. In fact, the only air in the reservoir will be that initially kept in to compensate for expansion and contraction of the heat storage medium. The drawing illustrates a "fluid piston" 38. In operation, trapped pre-dried air from the reservoirs is prevented from escaping by a high temperature fluid, such as orthodichlorobenzene 64. This dry air can be confined within the reservoir and maintained free of external contamination. The level of the high temperature fluid will of course change, depending on the heating and cooling cycles of the heat storage medium. A bellows type of apparatus may also be utilized as a vent sealing means.

Figure 2:
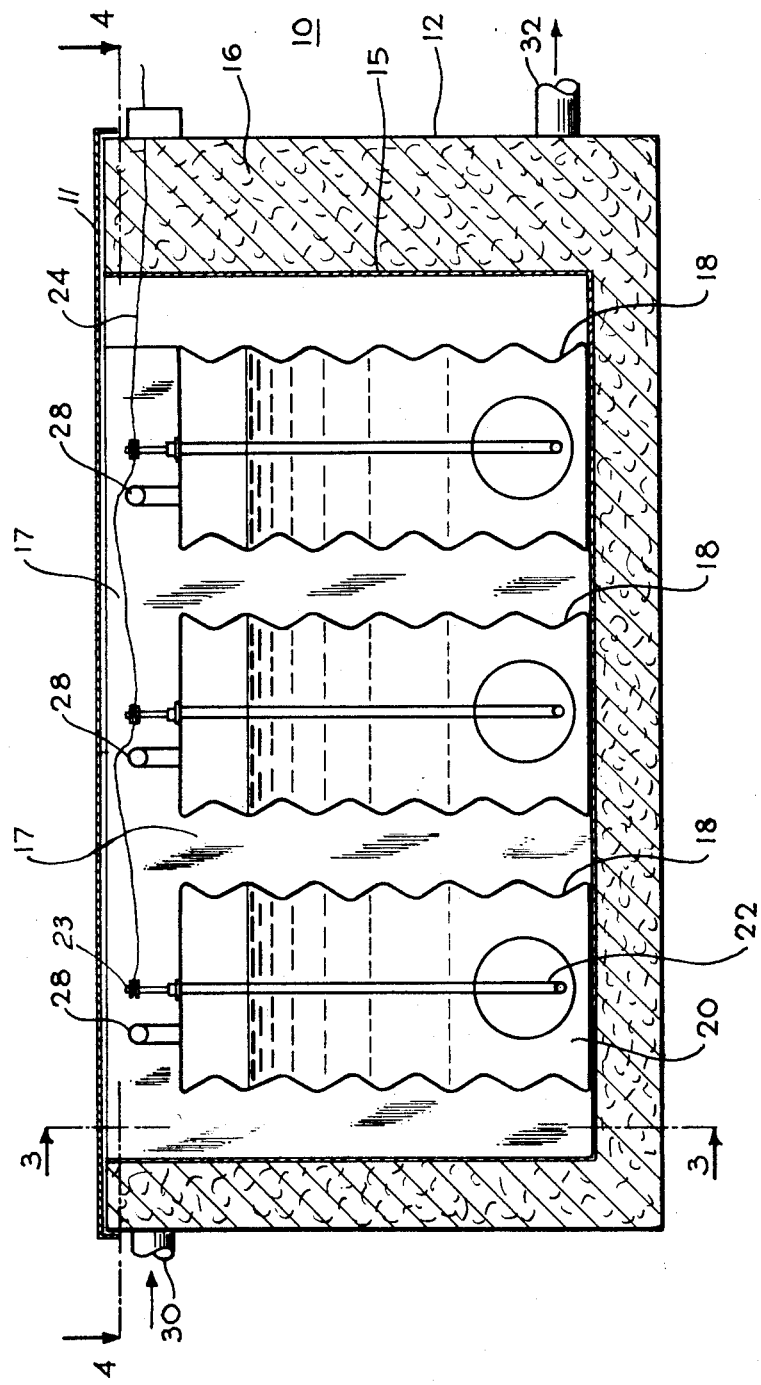
FIG. 2 is a vertical sectional view of a heating unit of the invention along line 2—2 of FIGURE 3.

FIG. 2 illustrates the configuration of the walls of reservoir 18. These walls may be straight, but a corrugated configuration, as illustrated, whereby the sides of the reservoirs are in contact with each other, will reduce the possibility of any distortion of the reservoir walls occurring as the heat storage medium expands and contracts on heating and cooling.

Insulation 16 in the heat storage system may be rock wool, glass wool, Sil-O-Cel, Liofelt, Dry Zero or any other insulating material known to the art or described in Handbook of Chemistry and Physics, forty-third edition, published by The Chemical Rubber Publishing Co., Cleveland, Ohio, (1961-1962), pages 2477 and 2478. Synthetic organic resin foams such as Hetrofoam (R), produced from a polyester resin manufactured by Hooker Chemical Corporation, Niagara Falls, N.Y., may be placed on the interior of the heating unit and allowed to be cured by heating the heat storage medium to a curing temperature. Additional insulation material is placed over this resin foam. This latter procedure will seal any possible heat leaks in the unit, improving insulation efficiency.

The heating element 22 of the invention may comprise a resistor material, such as, nichrome, covered by a material such as gold, low carbon steel, e.g., American Iron and Steel Institute Number 1020, and lower, classification and having an insulating material such as magnesium oxide, between the resistor and the cover. Other heating elements that can be utilized in the practice of this invention are disclosed in, copending application S.N. 366,471 filed May 11, 1964 now Patent No. 3,356,834, granted Dec. 5, 1967.

The following examples are given to illustrate the present invention and are not to be taken as limitative. All parts are by weight and temperatures are in degrees centigrade, unless otherwise set forth.

*Examples 1 and 2*

Heat storage media having the following compositions were prepared.

| Component | Percent by weight | |
|---|---|---|
| | Example 1 | Example 2 |
| Sodium hydroxide | 89.0 | 84.0 |
| Potassium hydroxide | 0.8 | 0.8 |
| Sodium nitrate | 8.0 | 8.0 |
| Sodium chloride | 1.0 | 1.0 |
| Sodium carbonate | 1.0 | 1.0 |
| Manganese dioxide | 0.2 | 0.2 |
| Sodium chromate | | 5.0 |

These compositions were tested in accordance with a standard corrosion test A-279-44T of the American Society for Testing Materials. In these examples steel coupons having a Society of Automotive Engineers' Classification number 1020 were subjected to contact with the heat storage media for three successive periods of 48 hours, 48 hours, and 168 hours, a total of 264 hours, and were weighed before and after each period. (Two thousand parts of the salt composition were utilized in each example.)

A temperature of about 640 degrees centigrade was maintained as an accelerated time test. It was found that the composition of Example 2, which contained an inhibitor therein, reduced the amount of corrosion by a factor of about six.

Heat storage media containing sodium phosphate, mixed oxides of iron, dissolved iron particles, sodium ferrite and sodium tetraborate also gave similar results.

Similar results are also obtained when these and the other heat storage compositions of this invention are utilized in apparatuses and methods in accordance with the invention, wherein the confined compositions are repeatedly heated and cooled in contact with apparatus walls and parts of the described materials of construction. Thus, the apparatuses last longer, due to stabilizing of the heat storage media and lower corrosion rates. The apparatuses and methods are safer and the use of the invention is more trouble-free.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A heating system comprising means for conducting a heat transfer medium to a heat storage unit, a heat storage unit comprising a container formed of a metal selected from the group of steel and nickel, a substantially anhydrous heat storage medium in said container comprising a major proportion of alkali metal hydroxide and a minor proportion of a non-reducing agent selected from the group consisting of alkali metal and alkaline earth metal sulfates, phosphates, halides, carbonates, stannates, silicates, fluosilicates, fluoborates, aluminates, bismuthates, borates, molybdates, tungstates, vanadates, nitrates, nitrites, manganates, permanganates, iodates, chlorates, perchlorates, persulfates, oxides, perborates and mixtures thereof and a corrosion inhibitor selected from the group consisting of iron, iron compounds, and alkali metal chromates, dichromates, phosphates, pyrophosphates and mixtures thereof, said heat storage unit having heating means within said heat storage medium for heating said heat storage medium to a temperature above the fusion point of the heat storage medium, means for bringing said heat transfer medium into thermal contact with said heat storage medium, means for conducting said heat transfer medium from said heat storage unit and means for withdrawing heat from said heat transfer medium to cool said heat storage medium below its fusion point.

2. The heating system of claim 1 wherein the heat transfer medium is air.

3. The heating system of claim 1 wherein the heating means is heated with electricity.

4. The heating system of claim 1 wherein the alkali metal hydroxide is sodium hydroxide.

5. The heating system of claim 1 wherein the non-reducing agent is an alkali metal nitrate and the corrosion inhibitor is an alkali metal chromate.

6. The heating system of claim 1 wherein the heat storage medium is maintained in the range of 60 to about 680 degrees centigrade by the heating means.

7. The heating system of claim 1 wherein the heat transfer medium is air, the alkali metal hydroxide is sodium hydroxide, the non-reducing agent is sodium nitrate, the corrosion inhibitor is sodium dichromate and the heat storage medium is maintained in the range of 60 to about 680 degrees centigrade by the heating means.

8. The heating system of claim 1 wherein the container is formed of low carbon steel.

References Cited

UNITED STATES PATENTS 3,299,945  1/1967  Rice et al. _____ 126—400 X
3,320,408  5/1967  Mekjean _____ 219—530

JAMES W. WESTHAVER, *Primary Examiner.*